(12) United States Patent
Hayford et al.

(10) Patent No.: US 10,767,486 B2
(45) Date of Patent: *Sep. 8, 2020

(54) MISTUNED CONCENTRIC AIRFOIL ASSEMBLY AND METHOD OF MISTUNING SAME

(71) Applicant: United Technologies Corporation, Farmington, CT (US)

(72) Inventors: Richard K. Hayford, Cap Neddick, ME (US); Steven J. Ford, Sanford, ME (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 87 days.

This patent is subject to a terminal disclaimer.

(21) Appl. No.: 16/106,221

(22) Filed: Aug. 21, 2018

(65) Prior Publication Data

US 2019/0032490 A1    Jan. 31, 2019

Related U.S. Application Data

(63) Continuation of application No. 14/618,478, filed on Feb. 10, 2015, now Pat. No. 10,119,403.

(51) Int. Cl.
*F01D 5/14* (2006.01)
*F01D 5/02* (2006.01)
(Continued)

(52) U.S. Cl.
CPC ............ *F01D 5/146* (2013.01); *F01D 5/022* (2013.01); *F01D 5/225* (2013.01); *F01D 25/06* (2013.01);
(Continued)

(58) Field of Classification Search
CPC .......... F01D 5/146; F01D 5/022; F01D 5/225; F01D 5/34; F01D 5/3069; F01D 5/10;
(Continued)

(56) References Cited

U.S. PATENT DOCUMENTS

| 1,263,473 A | 4/1918 | Schellens |
| 2,497,041 A | 2/1950 | Bodger |

(Continued)

FOREIGN PATENT DOCUMENTS

| EP | 1895142 | 3/2008 |
| EP | 1201878 | 5/2008 |

OTHER PUBLICATIONS

European Search Report for Application No. European Patent Application No. 15154877.3 completed Jun. 9, 2015.

*Primary Examiner* — David E Sosnowski
*Assistant Examiner* — Danielle M. Christensen
(74) *Attorney, Agent, or Firm* — Carlson, Gaskey & Olds, P.C.

(57) ABSTRACT

An airfoil assembly for a gas turbine engine according to an example of the present disclosure includes, among other things, an annular shroud having a radially inner face and a radially outer face opposing the radially inner face, a radially inner array of airfoils extending from the radially inner face, and a radially outer array of airfoils extending from the radially outer face. The radially inner array of airfoils are configured to guide flow within a radially inner bypass flow passage, the radially inner bypass flow passage bypassing and being radially outward of a compressor section. At least one, but fewer than each, airfoil of the radially inner array of airfoils is circumferentially aligned with a corresponding airfoil in the radially outer array of airfoils, and the remaining airfoils in the radially inner array of airfoils are misaligned with the airfoils of the radially outer array of airfoils.

(Continued)

A method of reducing a vibratory response of airfoils is also disclosed.

19 Claims, 4 Drawing Sheets

Related U.S. Application Data

(60) Provisional application No. 61/939,304, filed on Feb. 13, 2014.

(51) Int. Cl.
*F01D 5/22* (2006.01)
*F01D 25/06* (2006.01)

(52) U.S. Cl.
CPC ....... *F05D 2260/961* (2013.01); *Y02T 50/673* (2013.01)

(58) Field of Classification Search
CPC .......... F01D 25/06; F01D 25/04; F01D 6/041; F01D 6/04; F01D 6/042; F05D 2260/961; F05D 2260/96; F05D 2250/73; F02K 3/02; F02K 3/06; F02K 3/077
See application file for complete search history.

(56) References Cited

U.S. PATENT DOCUMENTS

| | | |
|---|---|---|
| 2,654,566 A | 10/1953 | Boyd et al. |
| 3,070,284 A | 12/1962 | Kent |
| 5,848,526 A * | 12/1998 | Hanson .................. F01D 5/145 60/226.1 |
| 6,200,091 B1 | 3/2001 | Bromann et al. |
| 8,459,944 B2 | 6/2013 | Hamana |
| 2013/0149133 A1 | 6/2013 | Ring |

* cited by examiner

MISTUNED CONCENTRIC AIRFOIL ASSEMBLY AND METHOD OF MISTUNING SAME

CROSS-REFERENCE TO RELATED APPLICATION

This application is a continuation of U.S. application Ser. No. 14/618,478 filed on Feb. 10, 2015, which claims priority to U.S. Provisional Application No. 61/939,304 filed on Feb. 13, 2014.

STATEMENT REGARDING GOVERNMENT SUPPORT

This invention was made with government support under Contract No. FA8650-09-D-2923-0021 awarded the United States Air Force. The government has certain rights in this invention.

BACKGROUND

This disclosure relates generally to a concentric airfoil assembly and, more particularly, to mistuning a concentric assembly to reduce vibrations.

Gas turbine engines are known and, typically, include a fan delivering air into a bypass duct as propulsion air and to be utilized to cool components. The fan also delivers air into a core engine where it is compressed in a compressor. The compressed air is then delivered into a combustion section where it is mixed with fuel and ignited. Products of the combustion pass downstream over turbine rotors, driving them to rotate.

One type of gas turbine engine has multiple bypass streams. In such engine, there is typically a radially outer third stream bypass flow and a radially inner main bypass flow. Other types of gas turbine engines have other bypass flow arrangements.

Gas turbine engines, and in particular gas turbine engines having multiple bypass streams, may include assemblies having a concentric airfoil arrays. These assemblies often have very little structural damping due to their symmetric nature. Lack of damping can lead to, among other things, high cycle fatigue issues resulting from high vibratory stresses, such as resonant or aero-elastic responses of the airfoils to dynamic pressure fluctuations. Mitigating these fatigue issues has involved increasing airfoil thicknesses, which can lead to localized hot spots and vibratory stresses and diminished aero-dynamic performance.

SUMMARY

An airfoil assembly according to an exemplary aspect of the present disclosure includes, among other things, an annular shroud having a radially inner face and a radially outer face opposing the radially inner face. A radially inner array of airfoils extends from the radially inner face, and a radially outer array of airfoils extends from the radially outer face. At least one airfoil of the radially inner array is circumferentially aligned with a corresponding airfoil in the radially outer array. At least one airfoil of the radially inner array is circumferentially misaligned with the airfoils of the radially outer array.

In another example of the foregoing assembly, one airfoil of the radially inner array is circumferentially aligned with a corresponding airfoil in the radially outer array at a twelve o'clock position, and the remaining airfoils in the radially inner array are misaligned with the airfoils of the radially outer array.

In another example of any of the foregoing assemblies, the radially inner array of airfoils are configured to guide flow within a radially inner bypass flow passage of a gas turbine engine, and the radially outer array of airfoils are configured to guide flow within a radially outer bypass flow passage of the gas turbine engine.

In another example of any of the foregoing assemblies, the radially inner bypass flow passage and the radially outer bypass flow passage are both radially outside a core flow passage of the gas turbine engine.

In another example of any of the foregoing assemblies, each of the radially inner array of airfoils at or above a horizontal midline is circumferentially aligned with a corresponding airfoil in the radially outer when is in an installed position.

In another example of any of the foregoing assemblies, the shroud, the radially inner array of airfoils, and the radially outer array of airfoils are cast together as a single unitary structure.

An airfoil assembly according to an exemplary aspect of the present disclosure includes, among other things, a shroud having a radially inner face and a radially outer face opposing the radially inner face. A radially inner array of airfoils extends from the inner face. A radially outer array of airfoils extends from the radially outer face. A distance between circumferentially adjacent airfoils of the radially inner array or circumferentially adjacent airfoils in the radially outer array varies.

In another example of the foregoing assembly, the shroud is an annular shroud.

In another example of any of the foregoing assemblies, the shroud, the radially inner array of airfoils, and the radially outer array of airfoils are cast together as a single unitary structure.

In another example of any of the foregoing assemblies, at least one selected airfoil of the radially inner array is circumferentially aligned with a corresponding airfoil in the radially outer array, and at least one selected airfoil of the radially inner array is circumferentially misaligned with the airfoils of the radially outer array.

In another example of any of the foregoing assemblies, one airfoil of the radially inner array is circumferentially aligned with a corresponding airfoil in the radially outer array at a twelve o'clock position, and the remaining airfoils of the radially inner array are circumferentially misaligned with all airfoils in the radially outer array.

In another example of any of the foregoing assemblies, the shroud is a middle shroud and the assembly further includes a radially inner shroud and a radially outer shroud. The radially inner array of airfoils extends from the middle shroud to the radially inner shroud. The radially outer array of airfoils extends from the middle shroud to the radially outer shroud.

In another example of any of the foregoing assemblies, the radially inner array of airfoils are configured to guide flow within a radially inner bypass flow passage of a gas turbine engine.

In another example of any of the foregoing assemblies, the radially outer array of airfoils are configured to guide flow within a radially outer bypass flow passage of the gas turbine engine.

In another example of any of the foregoing assemblies, the radially inner bypass flow passage and the radially outer bypass flow passage are both radially outside a core flow passage of the gas turbine engine.

A method of reducing a vibratory response of airfoils that support a shroud according to an exemplary aspect of the present disclosure includes, among other things, circumferentially misaligning at least one of the airfoils in a radially inner array of airfoils with all airfoils of a radially outer array of airfoils. Circumferentially aligning at least one of the airfoils in the radially inner array of airfoils with all airfoils of the radially outer array of airfoils.

In another example of the foregoing method, the method further includes aligning an airfoil of the radially inner array and an airfoil of the radially outer array at a twelve o'clock position.

In another example of any of the foregoing methods, the method further includes circumferentially misaligning the remaining airfoils of the radially inner array with all the airfoils of the radially outer array.

In another example of any of the foregoing methods, the method further includes guiding flow through a radially inner bypass flow passage using the radially inner array of airfoils, and guiding flow through a radially outer bypass flow passage using the radially outer array of airfoils.

In another example of any of the foregoing methods, the method further includes moving core flow through a core flow passage that is radially inside the radially inner bypass flow passage.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
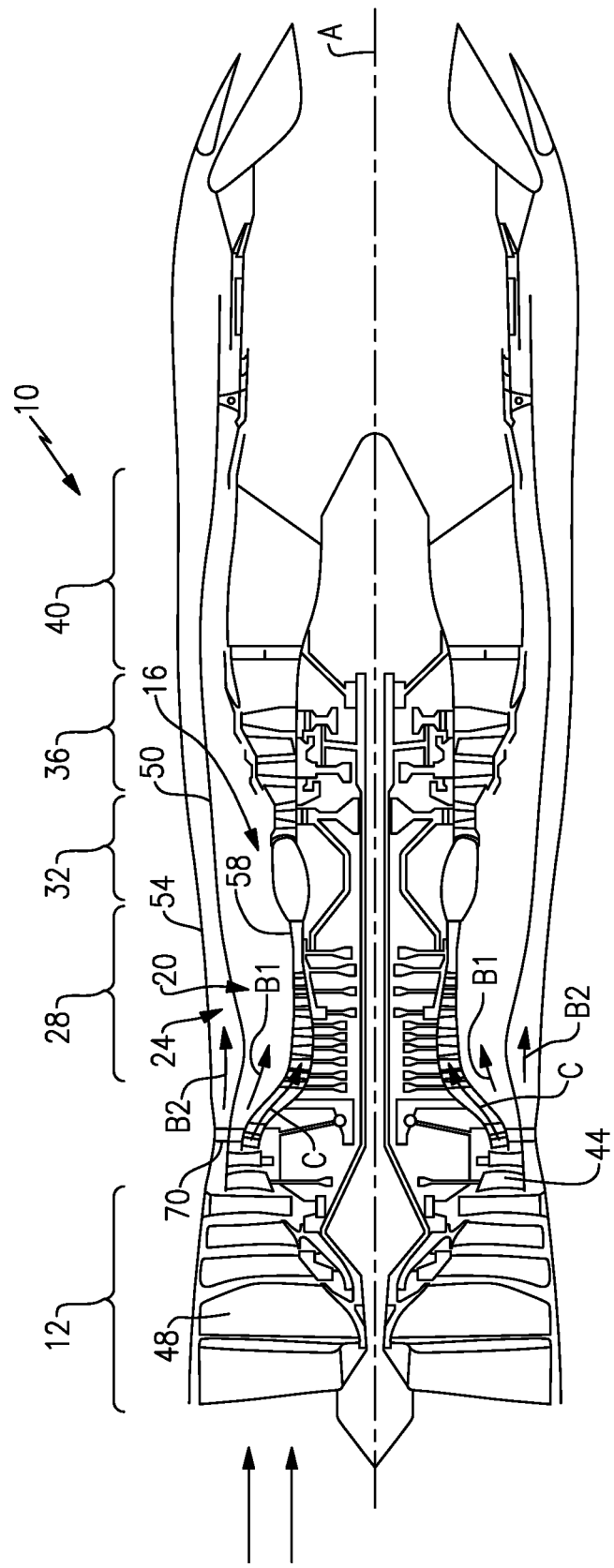
FIG. 1 schematically shows a multiple bypass stream gas turbine engine.

FIG. 1 shows an exemplary engine 10 in a schematic manner. A fan section 12 delivers air into a core engine 16, a radially inner bypass passage 20, and a radially outer bypass passage 24.

A core engine flow C of air is delivered to the core engine 16 from the fan section 12 and moves along a core engine flow passage extending through a compressor section 28, a combustor section 32, a turbine section 36, and then outwardly of a nozzle 40. Compressed air from the compressor section 28 is mixed with fuel and ignited in the combustor section 32. The products of combustion drive turbine rotors in the turbine section 36 to rotatably drive compressor rotors in the compressor section 28, and fan rotors 44 and 48 about an axis A.

The fan rotor 44 provides air to the main bypass flow B1 and the core engine flow C. The main bypass flow B1 flows through the radially inner bypass passage 20 inwardly of a main bypass flow outer housing 50, and outwardly of a core engine outer housing 58.

The fan rotor 48 provides air to the main bypass flow B1, the core engine flow C, and a third stream bypass flow B2. The third stream bypass flow B2 flows through a radially outer bypass passage 24 that is defined inwardly of an outer housing 54 and radially outwardly of the main bypass outer housing 50.

Figure 2:
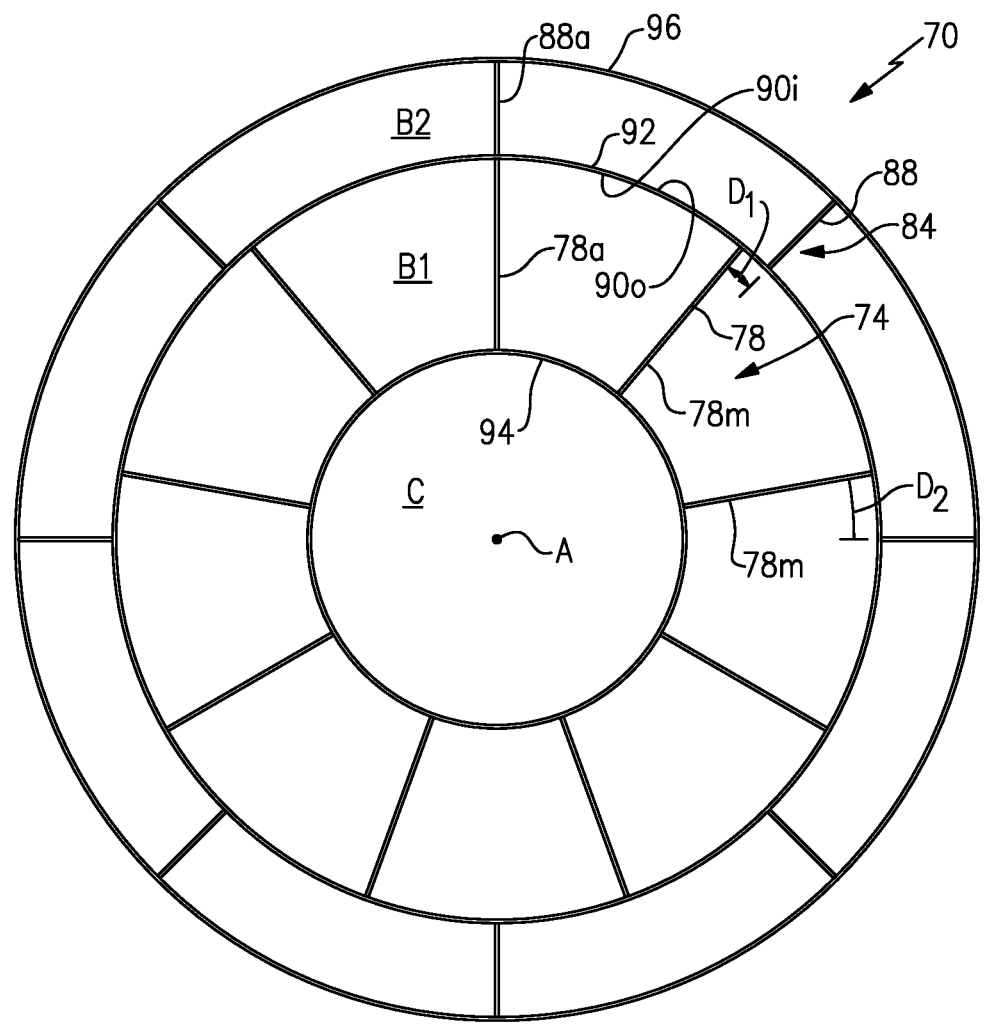
FIG. 2 is a highly schematic rear view of a concentric airfoil assembly from the engine of FIG. 1.
Figure 3:
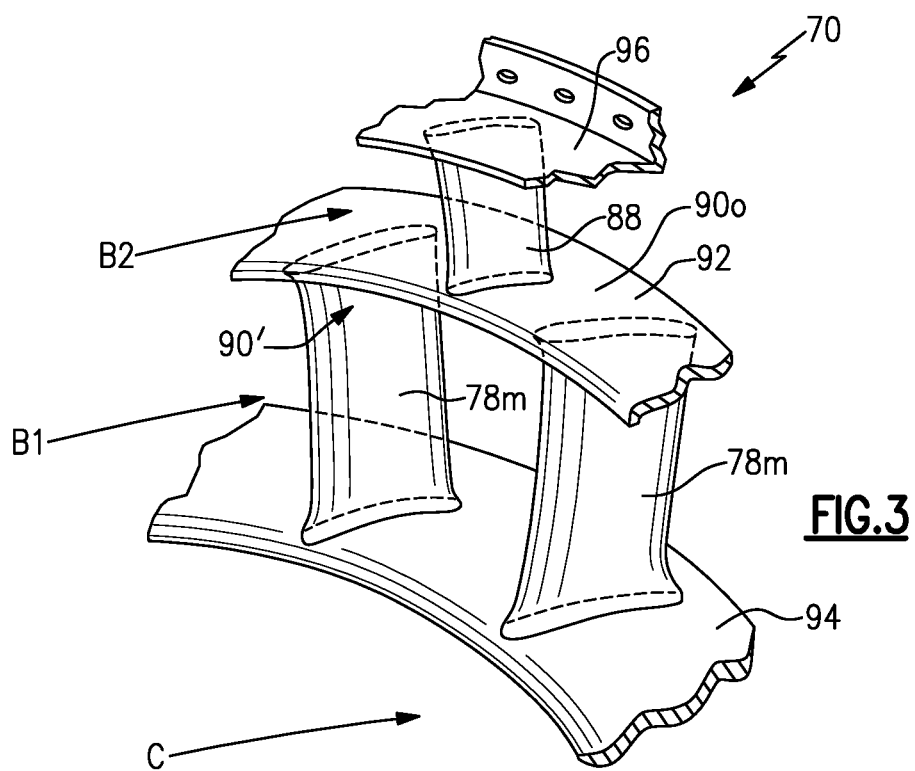
FIG. 3 is a perspective view of a circumferential section of the assembly of FIG. 2.
Figure 4:
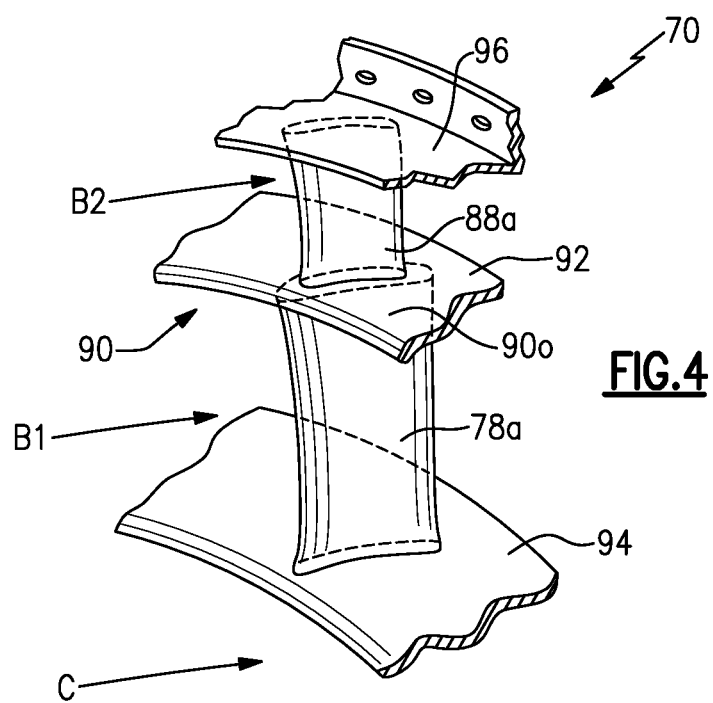
FIG. 4 is a perspective view of another circumferential section of the assembly of FIG. 2.

Referring now to FIGS. 2-4 with continued reference to FIG. 1, the example engine 10 includes a concentric airfoil assembly 70 used to guide flow within the radially inner bypass passage 20 and the radially outer bypass passage 24. The example airfoil assembly 70 includes a radially inner array 74 of airfoils 78 and a radially outer array 84 of airfoils 88. The airfoils 78 extend from a radially inner face 90$i$ of a mid-shroud 92 to a radially inner shroud 94. The airfoils 88 extend from a radially outer face 90$o$ of the mid-shroud 92 to a radially outer shroud 96. The shrouds 92, 94, and 96 are each annular in this example such that the assembly 70 is annular and extends circumferentially about the entire axis A. In other examples, the assembly 70 may be made of several individual assemblies extending circumferentially part of the way about the axis A.

The radially inner shroud 94, as can be appreciated, provides part of the core engine outer housing 58. The mid-shroud 92 provides part of the main bypass flow outer housing 50, and the radially outer shroud 96 provides part of the outer housing 54.

The example mid-shroud 92 can be supported radially within the engine by the arrays 74 and 84. However, the primary function of the arrays 74 and 84 is to guide flow. One or both of the axial ends of the mid-shroud 92 may be rigidly attached to other structures within the engine 10.

The arrays 74 and 84 are concentric about the axis A. The airfoils 78 of the radially inner array 74 are disposed within the radially inner bypass passage 20. The airfoils 88 of the radially outer array 84 are disposed within the radially outer bypass passage 24. Thus, the airfoils 78 and 88 are disposed within concentric bypass flow passages.

In other example assemblies, the radially inner array 74 can be disposed in the core engine 16 and the radially outer array 84 within the radially inner bypass passage 20. A person having skill in this art and the benefits of this disclosure could develop other areas of the engine suitable for utilizing the assembly 70.

The example assembly 70 is cast as a single unitary structure. In other examples, the airfoils 78 and 88 are produced separately from the shrouds 92, 94, and 96. The airfoils 78 and 88 are then fastened to the shrouds 94, 92, and 96. Fastening may include welding.

In this example, the airfoils 78 extend radially further than the airfoils 88. More specifically, the airfoils 88 have a radial length that is about half a radial length of the airfoils 78. An overall diameter of the example assembly may be from 24 to 36 inches (610 to 914 millimeters).

Flow moving through the assembly 70 may cause vibration. The example assembly 70 provides a circumferential distribution of the airfoils 78 and 88 that mitigates such vibrations.

In this example, the inner array 74 includes airfoils 78$m$ and an airfoil 78$a$. The airfoils 78$m$ are circumferentially misaligned from each of the airfoils 88. By contrast, the airfoil 78$a$ is circumferentially aligned with an airfoil 88$a$ of the array 84. The aligned airfoils 78$a$ and 88$a$ are at a twelve o'clock position in this example.

As used herein, twelve o'clock position refers to circumferential position relative to the axis A when the assembly 70 is in the orientation seen in FIG. 2, i.e. an orientation representative of the engine 10 or associated aircraft being on level ground or in straight and level flight.

Regarding the airfoils 78*m*, a circumferential distance between the airfoils 78*m* and the circumferentially closest airfoil 88 of the array 84 varies. That is, $D_1$ is less than $D_2$. By varying the circumferential spacing of the airfoils 78 relative to the airfoils 88, the fundamental bending frequencies of the airfoils 78 and 88 are varied. This is because the stiffness of an area 90 where the airfoils 78 and 88 interface with the mid-shroud 92 is influenced by the circumferential alignment of the airfoils 78 relative the airfoils 88.

If the airfoils are aligned, such as the airfoil 78*a* and the airfoil 88*a*, the interface area 90 is stiffened, which increases a fundamental mode frequency in the area 90. If the airfoils are not aligned, stiffness of the areas 90' where the airfoils 78 and 88 interface with the mid-shroud 92 is reduced and the fundamental mode frequency in the area 90' is lowered relative the area 90. Varying the circumferential spacing of the airfoils 78 and 88 at the mid-shroud 92 also varies the fundamental natural frequencies of the airfoils 78 and 88, which results in the assembly 70 being mistuned.

The assembly 70 includes nine airfoils 78 in the inner array 74 and eight airfoils 88 in the outer array 84. The airfoils 78 of the inner array 74 are distributed circumferentially equally about the axis A. The airfoils 88 in the outer array 84 are also distributed circumferentially evenly about the axis A. The difference in the number of total airfoils in the inner array 74 and the array 84 enables the circumferential misalignment of the airfoils 78 and 88. Since different numbers of airfoils are used in the inner array 74 and the outer array 84, and the airfoils are distributed evenly, the circumferential spacing between the airfoils of the arrays differs.

Figure 5:
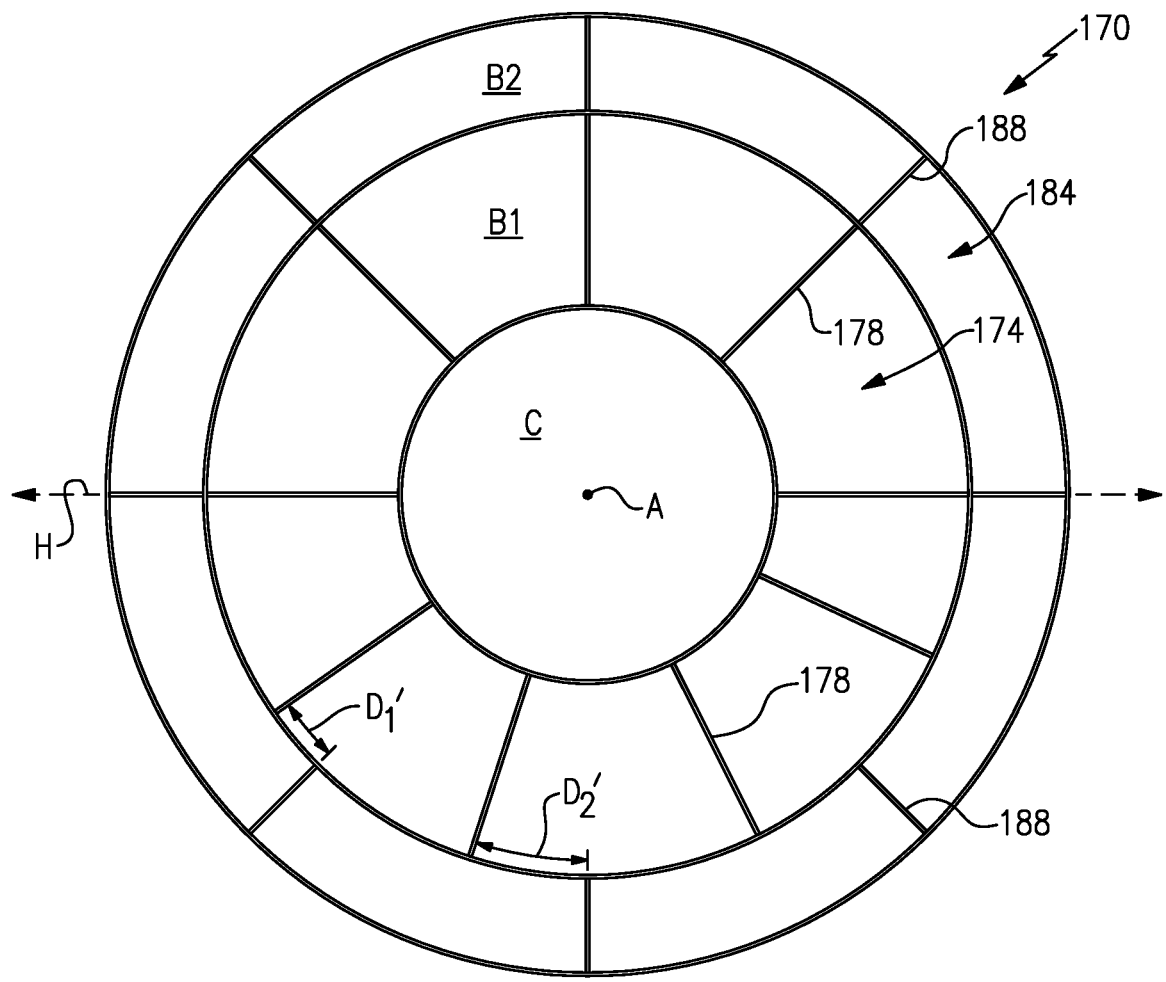
FIG. 5 illustrates another example concentric airfoil assembly suitable for use with the engine of FIG. 1.

Referring now to FIG. 5, another example assembly 170 is suitable for use within the engine 10. The example assembly 170 is mis-tuned by providing asymmetric patterns of airfoils 178 in the inner array 174 and airfoils 188 in the outer array 184.

In the example assembly 170 airfoils 178 that are at or above a horizontal midline H of the assembly 170 are aligned with a corresponding airfoil 188 of the array 184. Airfoils 178 that are below the horizontal midline H are misaligned with all airfoils 188 of the airfoil array 184. The example array 174 includes five airfoils 178 at or above the horizontal midline H, and four airfoils 178 below the horizontal midline H.

For the airfoils 178 below the horizontal midline H that are misaligned with airfoils in the array 184, the circumferential distance D between the airfoil 178 and the circumferentially closest airfoil 188 also varies in this example. That is, $D_1'$ is less than $D_2'$, for example.

Features of the disclosed examples include mistuning an assembly using variations in circumferential airfoils spacing between concentric airfoil arrays. The mistuning reduces resonant or aero-elastic response with minimal to no impact to the aerodynamic performance of the assembly.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. An airfoil assembly for a gas turbine engine, comprising:
   an annular shroud having a radially inner face and a radially outer face opposing the radially inner face;
   a radially inner array of airfoils extending from the radially inner face;
   a radially outer array of airfoils extending from the radially outer face;
   wherein the radially inner array of airfoils are configured to guide flow within a radially inner bypass flow passage, the radially inner bypass flow passage bypassing and being radially outward of a compressor section; and
   wherein at least one, but fewer than each, airfoil of the radially inner array of airfoils is circumferentially aligned with a corresponding airfoil of the radially outer array of airfoils, the remaining airfoils in the radially inner array of airfoils are misaligned with the airfoils of the radially outer array of airfoils, and fewer than each airfoil of the radially outer array of airfoils is circumferentially aligned with a corresponding airfoil of the radially inner array of airfoils.

2. The assembly of claim 1, wherein one airfoil of the radially inner array of airfoils is circumferentially aligned with a corresponding airfoil in the radially outer array of airfoils, the remaining airfoils in the radially inner array of airfoils are misaligned with the airfoils of the radially outer array of airfoils, the radially outer array of airfoils are configured to guide flow within a radially outer bypass flow passage, and the radially inner bypass flow passage and the radially outer bypass flow passage are both radially outside a core flow passage.

3. The assembly of claim 2, wherein:
   a distance varies between circumferentially adjacent airfoils in the radially outer array of airfoils.

4. The assembly of claim 2, wherein:
   a distance varies between circumferentially adjacent airfoils of the radially inner array of airfoils or between circumferentially adjacent airfoils in the radially outer array of airfoils; and
   the core flow passage extends through the compressor section, a combustor section and a turbine section.

5. The assembly of claim 4, wherein each of the radially inner and radially outer bypass flow passages is free of any rotatable airfoils downstream of the radially inner array of airfoils and downstream of the radially outer array of airfoils.

6. The assembly of claim 2, wherein the shroud, the radially inner array of airfoils and the radially outer array of airfoils are cast together as a single unitary structure.

7. An airfoil assembly for a gas turbine engine, comprising:
   an annular shroud having a radially inner face and a radially outer face opposing the radially inner face;
   a radially inner array of airfoils extending from the radially inner face;
   a radially outer array of airfoils extending from the radially outer face;
   wherein the radially inner array of airfoils are configured to guide flow within a radially inner bypass flow passage, the radially inner bypass flow passage bypassing and being radially outward of a compressor section;
   wherein a plurality of airfoils of the radially inner array of airfoils on a first side of a horizontal midline of the assembly are circumferentially aligned with a corresponding airfoil in the radially outer array of airfoils; and wherein at least one airfoil of the radially inner array is circumferentially misaligned with the airfoils of the radially outer array.

8. The assembly of claim 7, wherein each airfoil of the radially inner array of airfoils on the first side of the horizontal midline of the assembly is circumferentially aligned with a corresponding airfoil in the radially outer array of airfoils.

9. The assembly of claim 8, wherein the radially inner bypass flow passage and the radially outer bypass flow passage are both radially outside a core flow passage extending through the compressor section.

10. An airfoil assembly for a gas turbine engine, comprising:
  a shroud having a radially inner face and a radially outer face opposing the inner face;
  a radially inner array of airfoils extending from the radially inner face; and
  a radially outer array of airfoils extending from the radially outer face, wherein a distance varies between circumferentially adjacent airfoils of the radially inner array of airfoils or between circumferentially adjacent airfoils in the radially outer array of airfoils;
  wherein a total number of airfoils in the radially inner array of airfoils is greater than a total number of airfoils in the radially outer array of airfoils; and
  wherein one airfoil of the radially inner array of airfoils is circumferentially aligned with a corresponding airfoil in the radially outer array of airfoils, and the remaining airfoils of the radially inner array of airfoils are circumferentially misaligned with all airfoils in the radially outer array of airfoils.

11. The assembly of claim 10, wherein the shroud is an annular shroud, and wherein the shroud, the radially inner array of airfoils and the radially outer array of airfoils are cast together as a single unitary structure.

12. The assembly of claim 10, wherein the shroud is a middle shroud and further comprising a radially inner shroud and a radially outer shroud, the radially inner array of airfoils extending from the middle shroud to the radially inner shroud, the radially outer array of airfoils extending from the middle shroud to the radially outer shroud.

13. The assembly of claim 10, wherein the radially inner array of airfoils are configured to guide flow within a radially inner bypass flow passage, and wherein the radially outer array of airfoils are configured to guide flow within a radially outer bypass flow passage.

14. The assembly of claim 13, wherein the radially inner bypass flow passage and the radially outer bypass flow passage both bypass and are radially outward of a core flow passage, and wherein the core flow passage extends through a compressor section, a combustor section and a turbine section.

15. The assembly of claim 14, wherein the shroud, the radially inner array of airfoils, and the radially outer array of airfoils are cast together as a single unitary structure.

16. The assembly of claim 15, wherein each of the radially inner and radially outer bypass flow passages is free of any rotatable airfoils downstream of the radially inner array of airfoils and downstream of the radially outer array of airfoils.

17. A method of reducing a vibratory response of airfoils that support a shroud for a gas turbine engine, comprising:
  circumferentially aligning at least one airfoil in a radially inner array of airfoils with a corresponding airfoil of a radially outer array of airfoils;
  circumferentially misaligning the remaining airfoils in the radially inner array of airfoils with all airfoils of the radially outer array of airfoils; and
  guiding flow through a radially inner bypass flow passage using the radially inner array of airfoils, the radially inner bypass flow passage bypassing and being radially outward of a core flow passage; and
  wherein a distance varies between circumferentially adjacent airfoils of the radially inner array of airfoils or between circumferentially adjacent airfoils in the radially outer array of airfoils.

18. The method of claim 17, further comprising guiding flow through a radially outer bypass flow passage using the radially outer array of airfoils.

19. The method of claim 17, further comprising moving core flow through the core flow passage that is radially inside the radially inner bypass flow passage, the core flow passage extending through a compressor, a combustor and a turbine.

* * * * *